Sept. 8, 1953
B. N. HILL
2,651,654
TREATMENT OF HYDROCARBON SYNTHESIS NAPHTHA
Filed Jan. 21, 1949
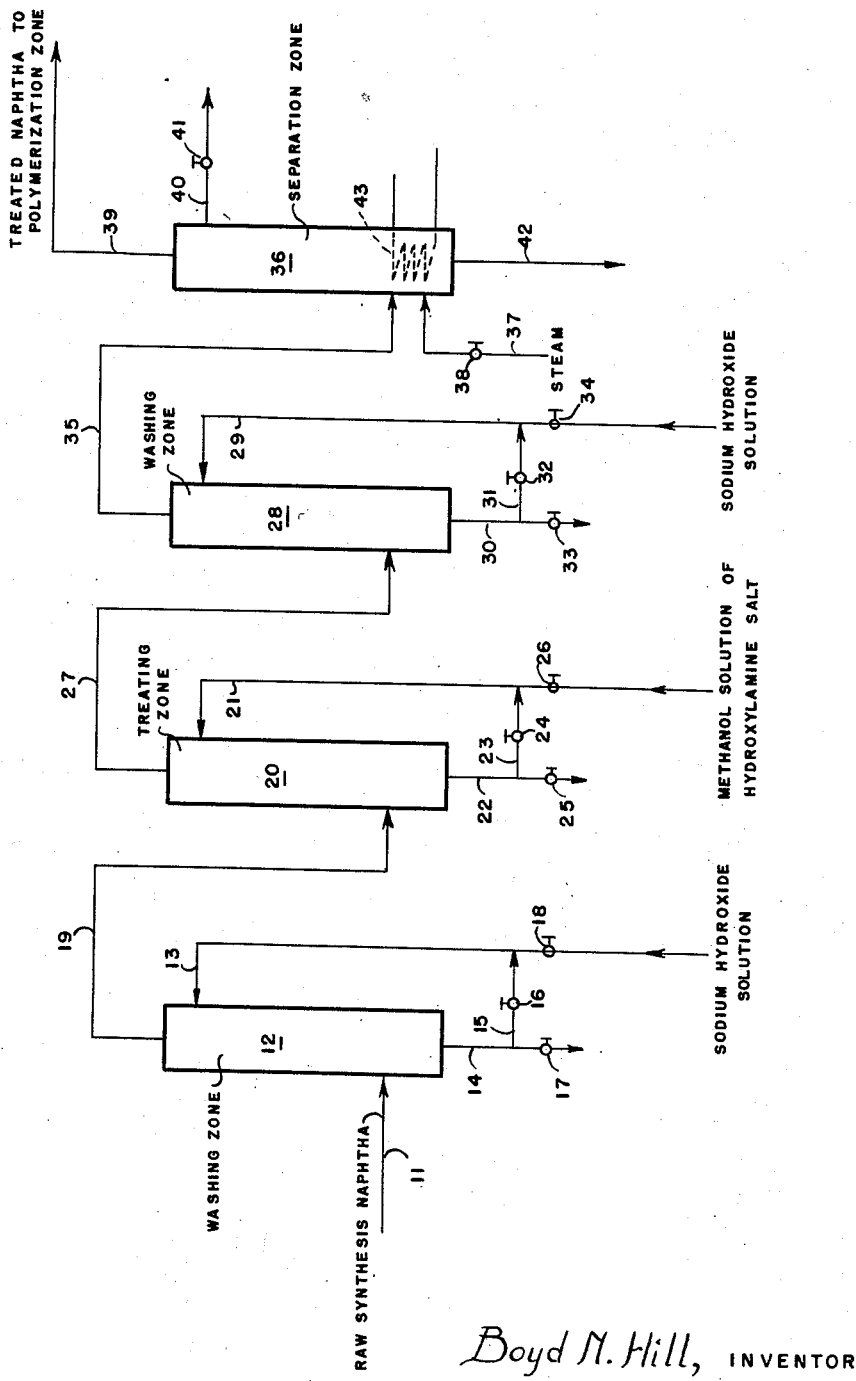
Boyd N. Hill, INVENTOR
BY
AGENT.

Patented Sept. 8, 1953

2,651,654

UNITED STATES PATENT OFFICE 2,651,654

TREATMENT OF HYDROCARBON SYNTHESIS NAPHTHA

Boyd N. Hill, Baytown, Tex., assignor, by mesne assignments, to Standard Oil Development Company, Elizabeth, N. J., a corporation of Delaware Application January 21, 1949, Serial No. 71,775

9 Claims. (Cl. 260—450)

The present invention is directed to a method for treating synthesis naphtha. More particularly, the invention is directed to a method for removing contaminating compounds from a synthesis naphtha resulting from contact of a mixture of carbon monoxide and hydrogen with a suitable catalyst under conversion conditions. In its more particular aspects the invention is directed to the removal of oxygenated organic compounds from synthesis naphtha resulting from contact of a gaseous mixture of carbon monoxide and hydrogen with a suitable catalyst under conversion conditions.

Since the early work by Fischer and Tropsch in Germany in which hydrocarbons and oxygenated organic compounds were produced by contacting mixtures of carbon monoxide and hydrogen with suitable catalysts, investigators have striven for a method for removing the oxygenated organic compounds which are produced with the hydrocarbons in the synthesis from carbon monoxide and hydrogen over suitable catalysts at conversion temperatures. The oxygenated organic compounds formed in this product usually comprise organic acids, esters, ketones, aldehydes, alcohols, and the like. The compounds are in solution with the hydrocarbons produced concurrently with them and while they are valuable chemicals in themselves, form a contaminant for the hydrocarbons. The hydrocarbons produced in this synthesis comprise normal and iso paraffins, olefins and aromatics and other compounds which have not been defined with sufficient particularity other than identifying them as conjugated compounds including those of the indene and styrene type. Some of the diene type compounds have also been found in naphthas produced by contacting carbon monoxide and hydrogen with suitable catalysts under suitable conditions.

The olefin hydrocarbons contained in the synthesis naphtha usually comprise a substantial amount of alpha olefins. Some beta olefins are also produced, but they are not as desirable as the alpha olefins and conditions may be adjusted in the synthesis step to produce mainly alpha olefins. These latter olefins are valuable starting materials from which lubricating oils are produced. The beta olefins, on the other hand, produce lubricating oil polymers of less desirable characteristics.

The indene and styrene type compounds, as well as the diene compounds, like the oxygenated organic compounds, act as undesirable contaminants in the olefinic fractions, especially when the latter are used as feed stock for polymerization processes. These hydrocarbons containing conjugated bonds polymerize at the same time as the alpha olefins, but they do not polymerize to polymers having desirable lubricating oil characteristics. Similarly, the oxygenated organic compounds are converted while in contact with polymerization catalysts to form products of undesirable characteristics. Besides they may react with the catalyst and cause unnecessary sludging of the catalyst resulting in polymerization processes of an uneconomical nature.

It will be seen from the foregoing discussion that the removal of compounds such as oxygenated organic compounds and hydrocarbons containing conjugated structures is very desirable if the hydrocarbons are to be used in conversion processes. As stated before, workers have turned their attention to this field for a number of years and many solutions to the problem have been suggested. For example, it has been known to extract oxygenated organic compounds with various chemical reagents such as sulfur dioxide, methyl alcohol, and other solvents, and also to treat the naphthas with solutions of alkali metal hydroxide for removal of contaminants. Other investigators have suggested contacting the product from a synthesis reaction of the type described with siliceous material to cause conversion of the contaminating bodies to more desirable compounds.

The foregoing type of processes suggested by the workers in this field have been attended with some success, but none of them achieve the purpose of providing a synthesis naphtha which is substantially free of contaminating compounds.

It is therefore the main object of the present invention to provide processes in which oxygenated organic compounds are substantially removed from a synthesis naphtha containing them.

Another object of the present invention is to provide a treating process in which a naphtha produced from carbon monoxide and hydrogen and contaminated with oxygenated organic compounds and with conjugated hydrocarbons is treated to remove the contaminating compounds in a sequence of treating operations.

A still further object of the present invention is to provide a new and improved treating process in which synthesis naphtha contaminated with oxygenated organic compounds and conjugated hydrocarbons is treated at relatively low temperatures and pressures to obtain a naphtha substantially free of contaminating compounds.

The foregoing objects of the present invention may be achieved by contacting a synthesis naphtha containing olefins and contaminated with oxygenated organic compounds and conjugated hydrocarbons in sequence with a solution of an alkali metal hydroxide, an alcoholic solution of a treating reagent selected from the class consisting of hydroxylamine and its inorganic salts and finally with an aqueous solution of an alkali metal hydroxide.

The present invention may be described briefly as involving the contacting of a naphtha boiling in the range from 100° to 600° F., obtained by contacting a mixture of carbon monoxide and hydrogen with a suitable catalyst under conditions to produce hydrocarbon and oxygenated organic compounds, with an aqueous solution of an alkali metal hydroxide at substantially atmospheric conditions following which the aqueous solution is removed from contact with the naphtha and the naphtha subjected to treatment with an alcoholic solution of a reagent selected from the class consisting of hydroxylamine and its inorganic salts and finally, after separation of the treating reagent from the naphtha, washing the naphtha with an aqueous solution of alkali metal hydroxide. Subsequent to the washing operation, the treated and washed naphtha is subjected to distillation to recover a fraction having substantially the same boiling range as the untreated naphtha. The purpose of the distillation is to reject high boiling compounds which are produced during the treating reaction, it being theorized that the contact with the treating reagent results in polymerization of compounds which are unidentified at present.

The synthesis naphtha employed in the present invention should be a naphtha boiling in the range from 100° to 600° F. and preferably should have a boiling range from about 100° to 400° F. This synthesis naphtha may be obtained by passing a mixture of carbon monoxide and hydrogen in the ratio of 1:1 to 2:1 over a suitable catalyst such as promoted iron catalyst as illustrated by ferroso-ferric oxide. There are many suitable catalysts which have been employed in the Fischer-Tropsch synthesis operation, among which may be mentioned cobalt, nickel, iron, and thorium. These catalysts may be employed singly or as mixtures, and either as the metals or as oxides thereof. Preferably the catalyst employed in producing the naphtha treated in accordance with the present invention is a promoted iron oxide catalyst such as ferroso-ferric oxide containing a suitable quantity of a promoter such as potassium hydroxide. Other suitable promoters comprise the alkali metal hydroxides, carbonates and oxides. For example, besides the potassium compounds, those of sodium and lithium may be used. Similarly, compounds of rubidium, copper, and cesium may be employed as promoters, as well as the alkaline earth compounds selected from group II of the periodic arrangement of the elements. Naphthas produced from carbon monoxide and hydrogen in contact with a promoted iron oxide such as ferroso-ferric oxide containing a small quantity of potassium hydroxide under conditions embracing temperatures from about 400° to 800° F. and pressures from about 10 to 600 p. s. i. g. will contain substantial quantities of paraffins, olefins, aromatics, oxygenated organic compounds of the type illustrated, as well as conjugated hydrocarbons such as those of the styrene and indene type and dienes. It will be apparent to the skilled workman that such a mixture must be suitably treated before it is useful in catalytic conversion operations for the reasons mentioned before.

The treating reagent employed in the present invention is preferably a methanol solution of hydroxylamine or its inorganic salts. While hydroxylamine may be employed, it is preferred to use an inorganic salt of hydroxylamine such as hydroxylamine hydrochloride, although other salts may be used in lieu of hydroxylamine hydrochloride. For example, inorganic salts of hydroxylamine may be obtained by reacting this compound with hydrobromic acid, hydrofluoric acid, nitric acid, sulfuric acid, and the like, although hydroxylamine hydrochloride will be the preferred treating reagent by virtue of its availability. The treating reagent selected from the class consisting of hydroxylamine and its inorganic salts should be used in an anhydrous or aqueous alcohol such as methyl, ethyl, propyl, and butyl alcohols, although methyl alcohol is to be preferred. The alcohol may be employed in an aqueous or anhydrous condition. When employed as an aqueous alcoholic solution, the alcohol should contain from about 5 to about 30 per cent by volume of water. When mentioning anhydrous alcohol I refer, for example, to alcohol containing no more than 2 per cent by volume of water and this may be considered as substantially anhydrous alcohol.

The amount of the treating reagent selected from the class consisting of hydroxylamine and its inorganic salts employed in an alcoholic solution may vary from about 5 to about 50 per cent by weight of the alcoholic solution. Good results have been obtained with alcohol containing 10 per cent, for example, of hydroxylamine hydrochloride. It will be apparent to the skilled workman that the amount of the treating reagent employed in the alcoholic solution will vary with the amount of the solution employed and the concentration of contaminants in the hydrocarbon being treated. It may be desirable to maintain the concentration of the reagent in the alcohol sufficiently high to permit easy separation of the alcohol and hydrocarbon phases. This phase separation will also be aided by having a small amount of water present in the alcoholic solution.

The amount of alcoholic solution employed to treat the contaminated naphtha will usually be in an equal amount to the naphtha being treated, but lesser or greater amounts of the alcoholic solution than the naphtha may be employed. For example, the ratio of naphtha to alcoholic solution may vary from about 0.2 to 2 to 1, although ordinarily an equal volume of the alcoholic solution and the naphtha being treated will be employed.

The alkali metal hydroxide employed in the washing steps preceding and following the treating step will usually be an aqueous solution of sodium hydroxide; however, aqueous solutions such as lithium and potassium hydroxide may be employed. The concentration of the alkali metal hydroxide solution will usually be about 10 weight per cent, although solutions containing from 5 to about 40 weight per cent of alkali metal hydroxide may be used. The amount of the alkali metal hydroxide solution employed in washing the untreated and treated naphtha may vary within rather wide limits. Usually an amount approximately equal to the amount of the treated naphtha will be employed.

The temperatures at which the various stages of the present invention are conducted will usually comprise a relatively low temperature. For example, the first step in which the raw naphtha is contacted with an alkali metal hydroxide solution will usually be conducted at atmospheric pressure and temperatures; for example, temperatures from about 60° to 100° F. The second step in which the naphtha is contacted with an alcoholic solution of a treating reagent selected from the class consisting of hydroxylamine and its inorganic salts may be conducted at temperatures from about 60° to 200° F. While ordinarily atmospheric pressures may be employed, under some conditions and especially when the higher temperatures are employed and a volatile fraction is being treated, it may be desirable to employ sufficient pressure during the operation to maintain the treating reagent and the naphtha being treated in a liquid condition. It is intended that the pressures employed may vary with the volatility of the naphtha being treated and that pressures ranging from atmospheric upward to a pressure sufficient to maintain liquid phase conditions are contemplated in the practice of the present invention. In the third stage wherein the treated naphtha is washed with an alkali metal hydroxide solution, it may be desirable to conduct this washing stage at a temperature approximately the same as the temperature at which the naphtha is treated with the alcoholic treating reagent selected from the class consisting of hydroxylamine and its inorganic salts. Thus, for example, if the treating step is conducted at substantially atmospheric temperatures, substantially atmospheric temperatures would be employed in the washing stage with aqueous sodium hydroxide. On the other hand, if elevated temperatures are employed, for the sake of economy, it may be desirable to employ elevated temperatures in the washing stage to eliminate the necessity of removing this heat since this heat may then be employed in the distillation operation which follows.

The distillation operation is preferably a steam distillation operation, although distillation may be conducted on the treated naphtha in the absence of steam.

The invention will now be further illustrated by reference to the drawing in which the single figure illustrates a preferred mode of conducting the invention. Referring now to the drawing, number 11 designates a charge line through which raw naphtha boiling in the range from 100° to 400° F. is introduced into the system from a source not shown. This raw synthesis naphtha is preferably obtained by contacting a mixture of carbon monoxide and hydrogen with promoted iron catalyst at a temperature and a pressure in the range given above. This naphtha produced from an iron catalyst is contaminated with oxygenated organic compounds of the type mentioned, indene and styrene hydrocarbons as well as dienes and also comprises a substantial amount of alpha olefins, paraffins and aromatics. This naphtha is introduced by line 11 into a washing zone 12 which is shown as a tower and is intended to include suitable internal contacting equipment to insure intimate contact between liquids and liquids. Such equipment may include trays containing bell caps, packing, and the like which are well known in the art. Introduced into washing zone 12 by line 13 is an aqueous solution of sodium hydroxide such as a 10 per cent by weight solution which flows downwardly in tower 12 and contacts countercurrently the ascending raw synthesis naphtha. This washing operation may be conducted at atmospheric conditions and results in the substantial removal of aldehydes and organic acids. The sodium hydroxide solution flows downward in washing zone 12 and is removed by line 14 and may be recycled in whole or in part by branch line 15, controlled by valve 16, to line 13. From time to time it may be necessary to discard a portion of the sodium hydroxide solution and this may be done by manipulating valve 17 in line 14. When the sodium hydroxide solution is discarded, an equivalent amount of fresh solution may be introduced by manipulating valve 18 in line 13, connecting this line to a source of sodium hydroxide solution not shown. The washed naphtha free of organic acids and aldehydes leaves tower 12 by line 19 and is introduced thereby into treating zone 20 which is a treating tower similar to washing zone 12 and is similarly provided with contacting equipment. The washed naphtha introduced by line 19 into treating zone 20 is contacted countercurrently with a methanol solution of a hydroxylamine salt introduced by line 21 from a source not shown. The descending alcoholic solution countercurrently contacts the ascending naphtha and effectively converts the ketones therein to oximes so that they may be removed in the subsequent treatment with sodium hydroxide solution. The esters contained in the naphtha undergo hydrolysis to form acids and alcohols which are removed by the alcoholic treating reagent which similarly removes the original alcohols present in the raw naphtha as it is introduced into the system. The treating reagent flows outwardly from treating zone 20 by line 22 and may be recycled by branch line 23 controlled by valve 24. Since the treating reagent may need replacement from time to time it will be desirable to open valve 25 in line 22 to discard an amount of the treating reagent and to replace it by an equivalent amount of treating reagent by opening valve 26 in line 21.

The treated naphtha then leaves treating zone 20 by line 27 which discharges it into a second washing zone 28 which is a treating tower provided with contacting equipment similar to zones 12 and 20. The treated naphtha containing oximes and other converted organic compounds is subjected in zone 28 to countercurrent treatment with a sodium hydroxide solution introduced by line 29 connecting to a source of sodium hydroxide solution not shown. This solution may contain approximately 10 per cent by weight of sodium hydroxide. The treated naphtha is contacted countercurrently in zone 28 with the sodium hydroxide solution introduced by line 29, the solution flowing downwardly therein and outwardly by line 30 and may be recycled to line 29 by branch line 31 controlled by valve 32. Since it may be necessary from time to time to replace part of the sodium hydroxide solution, valve 33 is provided in line 30 for withdrawal of sodium hydroxide solution and valve 34 is provided in line 29 for introduction of fresh solution to replace that withdrawn through valve 33. The treated naphtha after being washed in zone 28 is then discharged by line 35 into a distillation or separation zone 36 which is provided with suitable internal contacting equipment such as bell cap trays, packing, and the like to insure intimate contact between liquids and vapors. This zone 36 is also provided with a line 37 controlled by valve 38 for introduction of open steam, line 39 for removal of an overhead fraction, line 40 controlled by valve 41 for removal of a side stream and line 42 for withdrawal of heavier fractions. Separation zone 33 is also provided with a heating means illustrated by coil 43. This heating means may be an external heat exchanger, reboiler or internal reboiler as may be desired, or the heat may be provided by introducing superheated steam by line 37 controlled by valve 38.

In practicing the present invention according to the mode illustrated by the drawing, aldehydes and organic acids may be removed as described in washing zone 12, ketones converted to oximes in treating zone 20, while esters are caused to hydrolyze therein, and oximes and the hydrolysis products, as well as the original alcohols contained in the raw synthesis naphtha, may be removed in both zones 20 and 28. In separation zone 36 higher boiling compounds which result from contact with the alcoholic solution of hydroxylamine salt in zone 20 are separated by distillation. It will thus be seen from the foregoing discussion of the drawing that a simple integrated process is provided wherein substantially all contaminating oxygenated organic compounds are removed and the interfering conjugated hydrocarbons converted are removed to the extent where they are not bothersome when the treated naphtha is subsequently used in a catalytic conversion such as polymerization.

In separation zone 36 an overhead fraction, removed by line 39, having a boiling range substantially equivalent to that of the naphtha introduced by line 11 is obtained which may be suitably polymerized to form premium quality lubricating oil polymers. If desired, an intermediate boiling fraction may be obtained by line 40 and higher boiling fractions may be discarded by line 42.

In order to illustrate the invention further, reference will be made to the following examples in which a fraction boiling in the range from 140° to 400° F., obtained by contacting a mixture of carbon monoxide and hydrogen with an iron catalyst containing a suitable promoter, was divided into several portions and subjected to various treatments, as will be described. Each of the several portions was washed with an equal volume of 10 weight per cent solution of sodium hydroxide. One portion which had been treated with sodium hydroxide as has been described was then treated with an equal volume of 99 per cent methanol at 80° F. followed by the addition of a sufficient amount of water to obtain an 80:20 ratio of methanol to water. The raffinate from this operation was then washed with an equal volume of a 10 weight per cent solution of sodium hydroxide and redistilled to segregate a fraction boiling from 140° to 400° F. Another portion which had been treated initially with the sodium hydroxide was treated at 80° F. with an equal volume of a solution prepared by dissolving in 99 per cent methanol 10 per cent by weight of hydroxylamine hydrochloride. Another portion which had been treated initially with sodium hydroxide was treated at 145° F. with an equal volume of a solution prepared by dissolving in 99 per cent methanol 10 per cent by weight of hydroxylamine hydrochloride. Both of these treats, at the different temperatures, were followed by the addition of water to obtain an 80:20 ratio of alcohol to water and the two raffinates obtained by the two treats at the two different temperatures were then washed separately with an equal volume of 10 per cent by weight sodium hydroxide solution. The washed raffinates were then separately distilled to obtain segregated fractions boiling between 140° and 400° F. Another portion of the naphtha which had been treated with sodium hydroxide was treated with an equal volume of a solution prepared by dissolving in 99 per cent methanol 10 weight per cent of hydroxylamine hydrochloride plus the theoretical amount of sodium hydroxide to neutralize the hydroxylamine salt. Following this treat, which was conducted at 145° F., a sufficient amount of water was added to the alcohol to obtain an 80:20 ratio of alcohol to water. The treated naphtha, or raffinate as it may be called, was then washed with an equal volume of 10 weight per cent sodium hydroxide solution and then redistilled to obtained a fraction boiling in the range of the untreated naphtha. One portion of the naphtha treated in the foregoing manner was distilled at atmospheric pressure in the absence of steam, while another portion was distilled with the injection of open steam.

The naphthas obtained from the foregoing treating operations after redistillation, as has been described, were subjected to polymerization in the presence of aluminum chloride to obtain polymers boiling in the lubricating oil boiling range.

In the following Table I descriptions are given of the untreated naphtha, the naphtha washed with aqueous sodium hydroxide and water and redistilled, the naphtha treated with aqueous hydroxylamine hydrochloride alone followed by an aqueous caustic wash, the naphtha treated with aqueous methanol, and the naphtha treated in accordance with the present invention. Yield data for polymerizations carried out with the several naphthas are also given.

The first column in the table gives the inspection characteristics of the untreated naphtha, the second column presents the inspection characteristics of the naphtha which has been treated with an aqueous sodium hydroxide solution and redistilled. The third column presents a comparison with a process employing aqueous hydroxylamine hydroxide as a treating reagent. The fourth column presents a further comparison with aqueous methanol, while the fifth and sixth columns illustrate the practice of the present invention.

The fifth column shows treating temperatures of 80° and 145° F., while the sixth column shows variations between atmospheric and steam distillation with a treating temperature of 145° F.

Table I

| | 1 | 2 | 3 | | 4 |
|---|---|---|---|---|---|
| | Raw 140°–400° F. Fraction | 1×100 Vol. percent of 10 Wt. percent NaOH; H₂O Washed; Redistilled | 1×100 Vol. percent of 10 Wt. percent Aqueous NH₂OH.HCl; Washed with 10 Wt. Percent NaOH; H₂O Washed; Redistilled | | 1×100 Vol. percent 99% CH₃OH; H₂O added to 80:20 Ratio CH₃OH:H₂O; Raff. Washed with equal Vol. of 10 wt. percent NaOH; Redistilled |
| Treating Temp., °F | | About 80 | About 80 | 186 | About 80. |
| Time of Contact at Treating Temp., Hrs | | 1 | 3 | 1 | 1. |
| Type of Distillation | | Atmos | Atmos | Atmos | Atmos. |
| Yield of Treated and Redistilled, 140°–400° F.¹ | | 97.0 | 90.5 | 88.0 | 83.6. |
| Oxy. Compounds, Wt. Percent Functional Group: | | | | | |
| Alcohols (—OH) | 0.95 | 0.45 | 0.40 | 0.25 | 0.10. |
| Aldehydes (—CHO) | 0.20 | 0.00 | 0.00 | 0.00 | 0.00. |
| Organic Acids (—COOH) | 0.10 | 0.00 | 0.00 | 0.00 | 0.00. |
| Organic Esters (—COO) | 0.70 | 0.50 | 0.00 | 0.00 | 0.00. |
| Ketones (—CO) | 0.95 | 1.00 | 0.45 | 0.40 | 0.45. |
| Alpha Olefins, Mol percent based on Total Olefins | 78.2 | 81.3 | 84.9 | 84.6 | 87.8. |
| K in 0.1 mm. cell at 6.25 microns | 0.163 | 0.159 | 0.145 | 0.136 | 0.139. |
| Polymerization Data: | | | | | |
| Treating Temp., °F | | 150–166 | 150–164 | | 150–162. |
| Grs. AlCl₃/100 cc. Charge | | 6 | 6 | | 6. |
| Reaction Time, Hrs | | 6 | 6 | | 6. |
| Yield of Lube Polymer, Vol. Percent based on— | | | | | |
| a. Charge to Polymerization | | 22.5 | 38.0 | | 43.0. |
| b. NaOH Washed 140°–400° F. Fraction | | 21.8 | 33.6 | | 35.4. |
| Tests on Lube Polymer: | | | | | |
| Vis./100° F., S. S. U | | 292 | 569 | | 516. |
| Vis./210° F., S. S. U | | 50.8 | 65.6 | | 63.5. |
| V. I. | | 80 | 91 | | 92. |
| Tests on Sub-Lube Polymer: | | | | | |
| Bromine Number | | 47.4 | 18.1 | | 1.4. |
| Specific Gr., 20/4 | | 0.7630 | 0.7903 | | 0.7493. |

| | 5 | | | 6 | |
|---|---|---|---|---|---|
| | 1×100 Vol. Percent 99% CH₃OH Cont'g. 10 Wt. Percent NH₂OH.HCl; Then H₂O Added to Obtain 8:20 Ratio of CH₃OH:H₂O; Raff. Washed with Equal Vol. of 10 Wt. Percent NaOH; Redistilled | | | 1×100 Vol. Percent CH₃OH Cont'g. 10 Wt. Percent NH₂OH.HCl Plus Theo. Amt. NaOH to Neutralize NH₂OH.HCl; H₂O Added to 80:20 Ratio CH₃OH:H₂O; Raff. Washed with equal Vol. 10 Wt. Percent NaOH; H₂O Washed; Redistilled | |
| Treating Temp., °F | About 80 | 145 | 145 | 145 | 145. |
| Time of Contact at Treating Temp., Hrs | 1 | 1 | 1 | 1 | 1. |
| Type of Distillation | Atmos | Atmos | Atmos | Atmos | Steam. |
| Yield of Treated and Redistilled, 140°–400° F.¹ | 82.3 | 79.4 | 78.0 | 84.7 | 84.7. |
| Oxy. Compounds, Wt. Percent Functional Group: | | | | | |
| Alcohols (—OH) | 0.10 | 0.00 | 0.08 | 0.10 | 0.30. |
| Aldehydes (—CHO) | 0.00 | 0.00 | 0.00 | 0.00 | 0.00. |
| Organic Acids (—COOH) | 0.00 | 0.00 | 0.00 | 0.00 | 0.00. |
| Organic Esters (—COO) | 0.35 | 0.15 | 0.10 | 0.10 | 0.25. |
| Ketones (—CO) | 0.10 | 0.02 | 0.04 | 0.03 | 0.00. |
| Alpha Olefins, Mol Percent based on Total Olefins | 91.1 | 93.3 | 92.8 | 90.2 | 90.7. |
| K in 0.1 mm. cell at 6.25 microns | 0.134 | 0.131 | 0.127 | | 0.131. |
| Polymerization Data: | | | | | |
| Treating Temp., °F | | | 150–178 | 150–178 | 145–161. |
| Grs. AlCl₃/100 cc. Charge | | | 4.8 | 6 | 5.5. |
| Reaction Time, Hrs | | | 6 | 6 | 6. |
| Yield of Lube Polymer, Vol. Percent based on— | | | | | |
| a. Charge to Polymerization | | | 50.5 | 49.0 | 60.0. |
| b. NaOH Washed 140°–400° F. Fraction | | | 39.0 | 41.5 | 50.8. |
| Tests on Lube Polymer: | | | | | |
| Vis./100° F., S. S. U | | | 723 | 1,193 | 589. |
| Vis./210° F., S. S. U | | | 73.3 | 95.5 | 67.7. |
| V. I. | | | 92 | 92.5 | 95. |
| Tests on Sub-Lube Polymer: | | | | | |
| Bromine Number | | | 0.2 | 1.7 | 2.0. |
| Specific Gr., 20/4 | | | 0.7481 | 0.7622 | 0.7265. |

¹ Yield, volume percent, based on NaOH washed fraction; yield of NaOH washed stock based on raw naphtha was 93 vol. percent.

It will be noted from the data given in the foregoing table that naphtha treated in accordance with the present invention in which the naphtha is subjected in sequence to treatment with sodium hydroxide, alcoholic solution of hydroxylamine hydrochloride, further treatment with sodium hydroxide, and finally to redistillation, showed vastly reduced quantities of oxygenated organic compounds. It will be noted in every instance that the amount of oxygenated organic compounds contained in the naphtha treated in accordance with the present invention is greatly reduced from that contained in the naphtha treated with aqueous solution of hydroxylamine hydrochloride and with an aqueous solution of methanol. In short, it seems that the hydroxylamine hydrochloride and the methanol act in a synergistic manner and contribute to the reduction in the content of oxygenated organic compound. It will be noted further that the infrared absorption coefficient "K in a 0.1 mm. cell at 6.25 microns" length, which is an indication of the content of compounds containing conjugated double bonds has been reduced by the treatment in accordance with the present invention over that obtained with an aqueous solution of hydroxylamine hydrochloride or with aqueous methanol.

The polymer produced from the naphtha treated in accordance with the present invention is of very high quality as indicated by the high viscosity index of the lubricating oil fraction and the low bromine number of the sub-lube polymer. It is noteworthy that the polymer produced from naphtha treated in accordance with the present invention has a lower bromine number than that treated with an aqueous solution of hydroxylamine hydrochloride. It will also be noted that, when the naphtha is treated in accordance with the present invention and steam distilled and then polymerized, a still higher viscosity index lubricating polymer is obtained than when atmospheric distillation is employed.

The present invention is subject to numerous modifications which will be readily apparent to the skilled workman; for example, the two washing zones and the treating zone have been shown as countercurrent treating towers. It will be apparent to the skilled workman that these zones may be substituted for by incorporators, mixing pumps and other devices wherein contact between liquids and liquids is obtained. Such modifications will be within the spirit and scope of my invention.

It will also be apparent that while zone 26 is shown as a distillation zone, it may be a solvent extraction zone and that suitable solvents may be employed to separate the naphtha into its component parts. For example, solvents such as phenol, furfural, sulphur dioxide and various other well known solvents such as sulfolanes, and the like may be employed in separating the naphtha into its desirable components. In fact, it is contemplated that zone 36 may comprise either or both distillation and solvent extraction stages.

It is also contemplated that the methanol solution of hydroxylamine salt may contain, as illustrated in the example, a substantial amount of an alkali metal hydroxide which has been illustrated as sodium hydroxide, but which may be lithium or potassium hydroxide. It is also contemplated and considered within the spirit and scope of the present invention that the treating zone 20 may be conducted in two stages. When treating zone 20 is conducted in two stages, an anhydrous methanol solution of the hydroxylamine salt would be introduced and would contact the naphtha to treat it in the first stage. In the second stage an amount of water would be introduced into the anhydrous methanol solution of hydroxylamine salt to provide the requisite ratio of alcohol to water as shown in the examples. It is to be understood, however, that either an aqueous or anhydrous solution of hydroxylamine salt may be used in the practice of the present invention and that this treating operation may be conducted in one step.

The nature and objects of the present invention having been completely described and illustrated, what I wish to claim as new and useful and to secure by Letters Patent is:

1. A method for removing contaminating compounds from a naphtha fraction obtained by contacting a gaseous mixture of carbon monoxide and hydrogen with a suitable catalyst under conversion conditions to form a mixture of hydrocarbons and oxygenated organic compounds which comprises washing a contaminated naphtha fraction consisting of said mixture of hydrocarbons and oxygenated organic compounds with an aqueous solution of an alkali metal hydroxide, removing said aqueous solution from contact with said naphtha fraction, contacting the washed naphtha fraction with an alcoholic solution containing no more than 30% of water in which has been dissolved a treating reagent selected from the class consisting of hydroxylamine and its inorganic salts in an amount within the range of .2 to 2 parts of alcoholic solution for each part of washed naphtha, removing said alcoholic solution from contact with said naphtha, washing said treated naphtha with an aqueous solution of alkali metal hydroxide, removing said naphtha from contact with said alkali metal hydroxide solution and distilling said naphtha to recover a fraction having a boiling range substantially identical to the boiling range of the contaminated naphtha.

2. A method in accordance with claim 1 in which the alcoholic solution contains aqueous methanol.

3. A method in accordance with claim 1 in which the alcoholic solution contains substantially anhydrous methanol.

4. A method for removing contaminating oxygenated organic compounds from a naphtha fraction obtained by contact of a gaseous mixture of carbon monoxide and hydrogen with a promoted iron catalyst at a temperature in the range from 400° to 800° F. and at a pressure in the range from 10 to 600 p. s. i. g. which comprises washing said contaminated naphtha with an aqueous solution of sodium hydroxide at a temperature in the range from about 60° to 100° F., removing said aqueous solution from contact with said washed naphtha, treating said washed naphtha with a solution of a treating reagent selected from the class consisting of hydroxylamine and its inorganic salts dissolved in methanol which contains no more than 30% water in an amount at least equal to the amount of naphtha treated and at a temperature in the range between 60° and 200° F., separating said treated naphtha from said treating reagent, washing said treated naphtha with an aqueous solution of sodium hydroxide at a temperature in the range between 60° and 200° F., and distilling said washed treated naphtha to obtain a fraction having a boiling range approximating the boiling range of the contaminated naphtha fraction.

5. A method in accordance with claim 4 in which the naphtha fraction boils in the range between 100° and 600° F.

6. A method in accordance with claim 4 in which the treated washed fraction is distilled in the presence of open steam.

7. A method for removing contaminating oxygenated organic compounds from a naphtha fraction obtained by contact of a gaseous mixture of carbon monoxide and hydrogen with a promoted iron catalyst at a temperature in the range from 400° to 800° F. and a pressure in the range from 10 pounds to 600 p. s. i. g. which comprises washing said contaminated naphtha fraction at a temperature in the range between 60° and 100° F. with an aqueous solution of sodium hydroxide, separating said washed naphtha fraction from said aqueous solution of sodium hydroxide, treating said washed naphtha with a solution of a treating reagent selected from the class consisting of hydroxylamine and its inorganic salts in methanol in an amount at least equal to the amount of naphtha treated and at a temperature in the range between 60° and 200° F., adding a sufficient amount of water to said treating reagent to provide a ratio of methanol to water of 80:20, separating a treated naphtha from said aqueous alcoholic solution of said treating reagent, washing said treated naphtha with an aqueous solution of sodium hydroxide at a temperature in the range between 60° and 200° F. and distilling said treated, washed naphtha to obtain a fraction having a boiling range within the range of the contaminated naphtha fraction.

8. A method in accordance with claim 7 in which the treated, washed naphtha is distilled in the presence of open steam.

9. A method in accordance with claim 7 in which the naphtha fraction boils in the range between 100° and 600° F.

BOYD N. HILL.

References Cited in the file of this patent
UNITED STATES PATENTS

| Number | Name | Date |
|---|---|---|
| 2,099,475 | Giesen et al. | Nov. 16, 1937 |
| 2,270,204 | Schlack | Jan. 13, 1942 |
| 2,457,257 | Michael et al. | Dec. 28, 1948 |
| 2,539,393 | Arnold et al. | Jan. 30, 1951 |
| 2,552,513 | Blanchard et al. | May 15, 1951 |

OTHER REFERENCES

Fiesher et al.: "Organic Chemistry," pages 206–8, 218–20, D. C. Heath and Co., Boston, 1944.

Ser. No. 390,038, Laucht (A. P. C.), published April 20, 1943.